United States Patent
Vieira et al.

(10) Patent No.: US 12,273,151 B2
(45) Date of Patent: Apr. 8, 2025

(54) OVER-THE-AIR BEAMFORMING CALIBRATION

(71) Applicant: Telefonaktiebolaget LM Ericsson (publ), Stockholm (SE)

(72) Inventors: Joao Vieira, Hjärup (SE); Johan Nilsson, Höllviken (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 17/919,590

(22) PCT Filed: Apr. 23, 2020

(86) PCT No.: PCT/EP2020/061348
§ 371 (c)(1),
(2) Date: Oct. 18, 2022

(87) PCT Pub. No.: WO2021/213658
PCT Pub. Date: Oct. 28, 2021

(65) Prior Publication Data
US 2023/0155697 A1    May 18, 2023

(51) Int. Cl.
*H04B 17/12*    (2015.01)
*H04B 7/06*    (2006.01)
(Continued)

(52) U.S. Cl.
CPC .......... *H04B 17/12* (2015.01); *H04B 7/0617* (2013.01); *H04B 7/0691* (2013.01);
(Continued)

(58) Field of Classification Search
CPC .................................................. H04B 17/12
(Continued)

(56) References Cited

U.S. PATENT DOCUMENTS

| 8,798,695 B1 * | 8/2014 | Zheng | H01Q 21/28 455/575.7 |
| 2017/0346575 A1 * | 11/2017 | Tang | H04B 7/0617 |
| 2021/0314128 A1 * | 10/2021 | Li | H04L 5/0091 |

FOREIGN PATENT DOCUMENTS

WO    2016176626 A1    11/2016

OTHER PUBLICATIONS

PCT International Search Report, mailed Oct. 27, 2020, in connection with International Application No. PCT/EP2020/061348, all pages.

(Continued)

*Primary Examiner* — Lihong Yu
(74) *Attorney, Agent, or Firm* — Sage Patent Group

(57) ABSTRACT

A method of over-the-air beamforming calibration is disclosed for a multi-antenna transceiver having a first plurality of antenna elements connected to respective transceiver chains. Beamforming calibration comprises determining respective beamforming calibration factors for the transceiver chains of the antenna elements of the first plurality. The method comprises determining a second plurality of measurement resources for calibration sounding, wherein the second plurality is smaller than the first plurality. The method also comprises (for each measurement resource of the second plurality) selecting one or more antenna elements of the first plurality for sounding signal transmission, wherein each antenna element of the first plurality is selected for one or more of the measurement resources of the second plurality. The method also comprises (using each measurement resource of the second plurality) overlappingly transmitting respective sounding signals by the selected one or more antenna elements. Corresponding apparatus, multi-antenna transceiver, wireless communica- (Continued)

tion device and computer program product are also disclosed.

24 Claims, 4 Drawing Sheets

(51) Int. Cl.
    *H04B 7/08*         (2006.01)
    *H04B 17/14*       (2015.01)
    *H04B 17/21*       (2015.01)

(52) U.S. Cl.
    CPC ........... *H04B 7/0874* (2013.01); *H04B 17/14* (2015.01); *H04B 17/21* (2015.01)

(58) Field of Classification Search
    USPC .......................................................... 375/267
    See application file for complete search history.

(56) References Cited

OTHER PUBLICATIONS

PCT Written Opinion, mailed Oct. 27, 2020, in connection with International Application No. PCT/EP2020/061348, all pages.
Rogalin et al., "Hardware-Impairment Compensation for Enabling Distributed Large-Scale MIMO", downloaded on Sep. 29, 2020 from IEEE Xplore, 10 pages.
Vieira et al., "Reciprocity Calibration for Massive MIMO: Proposal, Modeling, and Validation", IEEE Transactions on Wireless Communications, vol. 16, No. 5, May 2017, pp. 3042-3056.

\* cited by examiner (a)

(b)

(c)

OVER-THE-AIR BEAMFORMING CALIBRATION

TECHNICAL FIELD

The present disclosure relates generally to the field of wireless communication. More particularly, it relates to beamforming calibration for a multi-antenna transceiver.

BACKGROUND

There exist various approaches for beamforming calibration of a multi-antenna transceiver. A first group of such approaches involves using an internal calibration network in the multi-antenna transceiver device, and a second group of such approaches involves over-the air signaling.

Approaches involving using an internal calibration network typically entails high complexity in terms of hardware and/or software. Approaches involving over-the air signaling typically entails signaling overhead and/or suffers from dependency on the radio channel.

There is a need for approaches for beamforming calibration of a multi-antenna transceiver.

Preferably, such approaches have one or more of the following advantages: being less complex than internal calibration network approaches of the prior art, requiring less signaling overhead than over-the air signaling approaches of the prior art, being less dependent on the radio channel than over-the air signaling approaches of the prior art, and scaling well (e.g., in terms of slowly growing overhead) when the number of antenna elements increases and/or when the number of transceiver chains to be calibrated increases.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like. It is an object of some embodiments to solve or mitigate, alleviate, or eliminate at least some of the above or other disadvantages.

A first aspect is a method of over-the-air beamforming calibration for a multi-antenna transceiver having a first plurality of antenna elements connected to respective transceiver chains, wherein beamforming calibration comprises determining respective beamforming calibration factors for the transceiver chains of the antenna elements of the first plurality.

The method comprises determining a second plurality of measurement resources for calibration sounding, wherein the second plurality is smaller than the first plurality, (for each measurement resource of the second plurality) selecting one or more antenna elements of the first plurality for sounding signal transmission, wherein each antenna element of the first plurality is selected for one or more of the measurement resources of the second plurality, and (using each measurement resource of the second plurality) overlappingly transmitting respective sounding signals by the selected one or more antenna elements.

In some embodiments—when selecting one or more antenna elements for sounding signal transmission comprises selecting two or more antenna elements for overlapping sounding signal transmission using a measurement resource—the selection comprises selecting antenna elements having a mutual coupling that exceeds a mutual coupling threshold.

In some embodiments, the mutual coupling is in relation to a non-selected antenna element.

In some embodiments, determining the second plurality comprises selecting a first size of the second plurality for a first traffic load of a communication system wherein the multi-antenna transceiver is operating, and selecting a second size of the second plurality for a second traffic load of the communication system, wherein the first size is larger than the second size when the first traffic load is lower than the second traffic load.

In some embodiments, determining the second plurality comprises selecting a third size of the second plurality for a first calibration measurement quality metric, and selecting a fourth size of the second plurality for a second calibration measurement quality metric, wherein the third size is larger than the fourth size when the first calibration measurement quality metric indicates lower calibration measurement quality than the second calibration measurement quality metric.

In some embodiments, the method further comprises acquiring sounding signal transmission measurements by receiving, using each measurement resource of the second plurality and for each non-transmitting antenna element of the first plurality, a signal corresponding to the one or more transmitted respective sounding signals.

In some embodiments, the method further comprises determining respective beamforming calibration factors for the transceiver chains of the antenna elements of the first plurality based on the received signals.

In some embodiments, the method further comprises performing channel estimation.

In some embodiments, the method further comprises beamforming a communication signal based on the channel estimation and based on the determined beamforming calibration factors, and transmitting the communication signal to the one or more other transceiver chains.

In some embodiments, performing channel estimation comprises performing reception channel estimation, and beamforming the communication signal based on the channel estimation and based on the determined beamforming calibration factors comprises computing a beamformer using un-calibrated reception channel estimates and applying the determined beamforming calibration factors to the computed beamformer.

In some embodiments, beamforming calibration comprises determining respective beamforming calibration factors for the transceiver chains of the antenna elements of the first plurality based on sounding signal transmission measurements, wherein a first transfer function defines a relation between the sounding signal transmission measurements and the beamforming calibration factors.

In some embodiments, determining the second plurality is conditioned on that a number of sounding signal transmission measurements achievable using the second plurality of measurement resources is larger than, or equal to, a sum of a number of beamforming calibration factors to be determined and a number of parameters of the first transfer function.

In some embodiments, each beamforming calibration factor represents a ratio between receiver path gain and transmitter path gain for a corresponding transceiver chain or a ratio between transmitter path gain and receiver path gain for a corresponding transceiver chain.

In some embodiments, the beamforming calibration is for providing a calibrated transmission channel which is closer to reciprocal with an un-calibrated reception channel than an un-calibrated transmission channel is.

In some embodiments, each respective transceiver chain comprises a transmitter chain and a receiver chain, and determining respective beamforming calibration factors for the transceiver chains of the antenna elements of the first plurality comprises determining respective beamforming calibration factors for the transmitter chains and/or determining respective beamforming calibration factors for the receiver chains.

In some embodiments, beamforming calibration comprises determining respective beamforming calibration factors for the transceiver chains of the antenna elements of the first plurality based on sounding signal transmission measurements, and the sounding signal transmission measurements is a function of the beamforming calibration factors and mutual couplings between the antenna elements of the first plurality.

In some embodiments, determining the second plurality is conditioned on that a number of sounding signal transmission measurements achievable using the second plurality of measurement resources is larger than, or equal to, a sum of a number of beamforming calibration factors to be determined.

In some embodiments, a second transfer function defines a relation between the sounding signal transmission measurements and the beamforming calibration factors for the transmitter chains, the second transfer function being based on the beamforming calibration factors for the receiver chains and the mutual couplings between the antenna elements of the first plurality.

In some embodiments—when selecting one or more antenna elements for sounding signal transmission comprises selecting two or more antenna elements for overlapping sounding signal transmission using a measurement resource—the selection is conditioned on that an estimate of the corresponding—first or second—transfer function meets a transfer function condition.

In some embodiments, the transfer function condition comprises one or more of: a smallest eigenvalue of the transfer function being larger than an eigenvalue threshold, the smallest eigenvalue of the transfer function having a larger value than the respective smallest eigenvalues of one or more other possible transfer functions, a ratio between largest and smallest eigenvalues of the transfer function being smaller than an eigenvalue ratio threshold, and the ratio between largest and smallest eigenvalues of the transfer function being smaller than the respective ratios between largest and smallest eigenvalues of one or more other possible transfer functions.

In some embodiments, it is determined whether a candidate transfer function meets the transfer function condition based on an estimation of transfer function parameters determined during a previous beamforming calibration.

In some embodiments—when selecting one or more antenna elements for sounding signal transmission comprises selecting two or more antenna elements for overlapping sounding signal transmission using a measurement resource of the second plurality—the selection is conditioned on that the number of selected antenna elements differs by at most an absolute value of one from the number of antenna elements selected for overlapping sounding signal transmission using any of the other measurement resources of the second plurality.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for over-the-air beamforming calibration of a multi-antenna transceiver having a first plurality of antenna elements connected to respective transceiver chains, wherein beamforming calibration comprises determining respective beamforming calibration factors for the transceiver chains of the antenna elements of the first plurality.

The apparatus comprises controlling circuitry configured to cause determination of a second plurality of measurement resources for calibration sounding, wherein the second plurality is smaller than the first plurality, (for each measurement resource of the second plurality) selection of one or more antenna elements of the first plurality for sounding signal transmission, wherein each antenna element of the first plurality is selected for one of the measurement resources of the second plurality, and (using each measurement resource of the second plurality) overlapping transmission of respective sounding signals by the selected one or more antenna elements.

A fourth aspect is an apparatus for over-the-air beamforming calibration of a multi-antenna transceiver having a first plurality of antenna elements connected to respective transceiver chains, wherein beamforming calibration comprises determining respective beamforming calibration factors for the transceiver chains of the antenna elements of the first plurality.

The apparatus comprises a determiner, and a selector. The determiner is configured to determine a second plurality of measurement resources for calibration sounding, wherein the second plurality is smaller than the first plurality. The selector is configured to (for each measurement resource of the second plurality) select one or more antenna elements of the first plurality for sounding signal transmission, wherein each antenna element of the first plurality is selected for one of the measurement resources of the second plurality.

In some embodiments, the apparatus also comprises a transmitter configured to (using each measurement resource of the second plurality) overlappingly transmit respective sounding signals by the selected one or more antenna elements.

In some embodiments, the apparatus of any of the third and fourth aspects further comprises the antenna elements and/or the transceiver chains.

A fifth aspect is a multi-antenna transceiver comprising the apparatus of any of the third and fourth aspects.

A sixth aspect is a wireless communication device comprising the apparatus of any of the third and fourth aspects and/or the multi-antenna transceiver of the fifth aspect.

In some embodiments, any of the above aspects may additionally have features identical with or corresponding to any of the various features as explained above for any of the other aspects.

In one example, the measurement resources are measurement intervals, and overlapping transmission using a measurement resource is simultaneous transmission during a measurement interval. This example will be used in the following description. It should be noted, however, that other measurement resources are also possible for overlapping transmission (e.g., frequency resources, code resources, spatial resources, etc.).

An advantage of some embodiments is that approaches are provided for beamforming calibration of a multi-antenna transceiver.

An advantage of some embodiments is that the amount of signaling overhead due to over-the-air calibration signaling is adjustable.

An advantage of some embodiments is that the amount of signaling overhead due to over-the-air calibration signaling is reduced compared to over-the air signaling approaches of the prior art.

An advantage of some embodiments is that a trade-off possibility is provided between calibration accuracy and the amount of signaling overhead due to over-the-air calibration signaling.

An advantage of some embodiments is that approaches are provided which scales well when the number of antenna elements increases and/or when the number of transceiver chains to be calibrated increases.

Generally, references herein to the number of antenna elements may be equally applicable for the number of transceiver chains (e.g., statements regarding the number of antenna elements to be calibrated may be equally applicable for the number of transceiver chains to be calibrated), and vice versa.

In a typical example, there may be a one-to-one correspondence between the number of antenna elements and the number of transceiver chains (i.e., there may be one antenna element per transceiver chain). Such a one-to-one correspondence will be assumed in the examples used herein. It should be noted, however, there may generally be one, or more than one, antenna element per transceiver chain.

Thus, selecting—for each measurement resource of the second plurality—one or more antenna elements of the first plurality for sounding signal transmission may be realized by selecting—for each measurement resource of the second plurality—one or more antenna transceiver chain for sounding signal transmission, wherein each selected transceiver chain is connected to exactly one antenna elements of the first plurality.

Alternatively, selecting—for each measurement resource of the second plurality—one or more antenna elements of the first plurality for sounding signal transmission may be realized by selecting—for each measurement resource of the second plurality—one or more antenna transceiver chain for sounding signal transmission, wherein each selected transceiver chain is connected to one or more antenna elements of the first plurality. In these embodiments, there may be a third plurality of transceiver chains, wherein the third plurality is smaller than the first plurality and larger than the second plurality.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
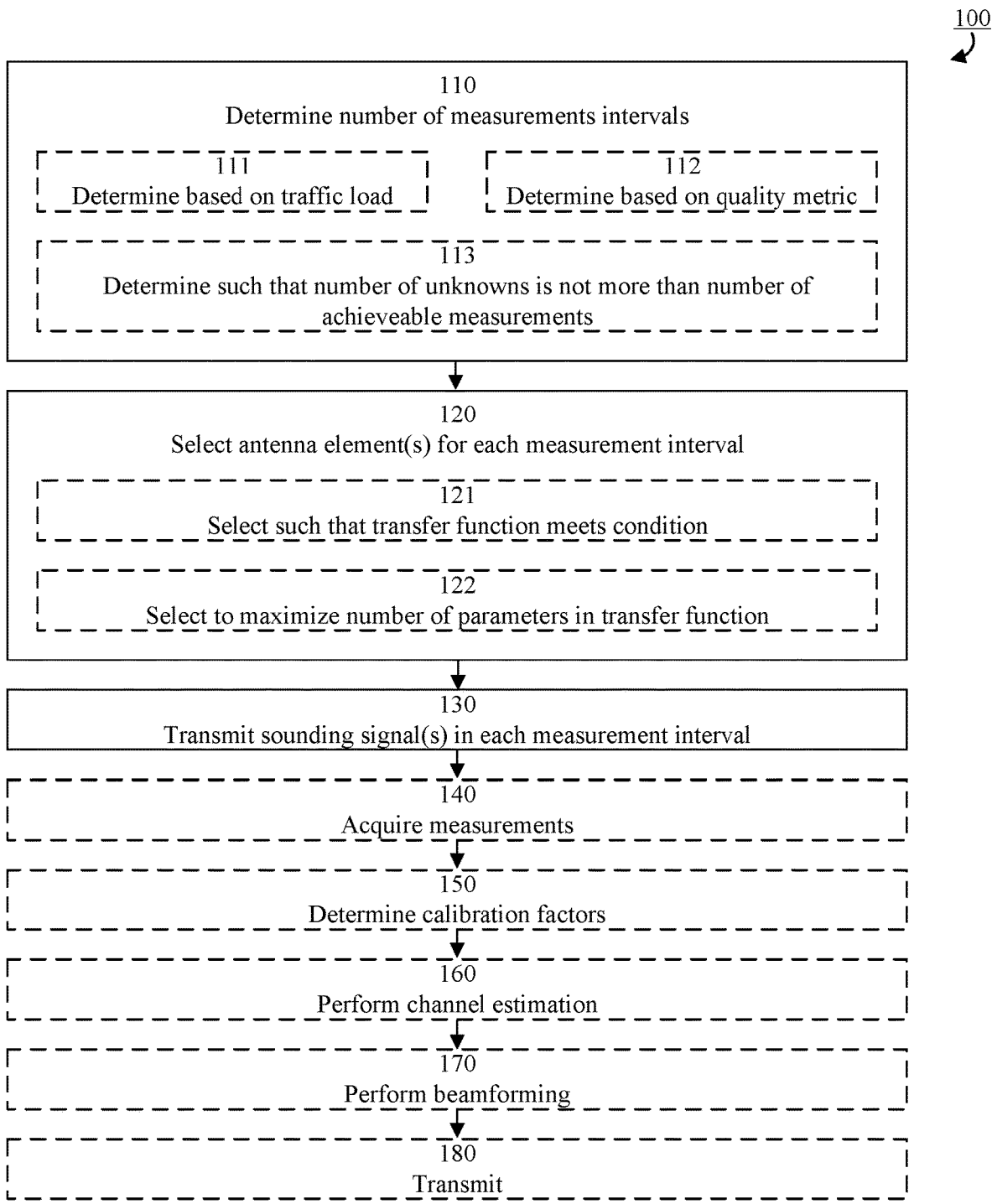
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where approaches are provided for beamforming calibration of a multi-antenna transceiver.

Generally, beamforming calibration comprises determining respective beamforming calibration factors for the transceiver chains of a multi-antenna transceiver. Typically, each transceiver chain comprises a transmitter chain and a receiver chain.

Two different groups of example embodiments will be used throughout this description to exemplify application of the approaches presented herein.

The first group of example embodiments relates to situations where each beamforming calibration factor represents a ratio between receiver path gain and transmitter path gain for a corresponding transceiver chain, or a ratio between transmitter path gain and receiver path gain for a corresponding transceiver chain. Such situations may occur, for example, in scenarios where reciprocity is desirable. Thus, in some embodiments, the beamforming calibration is for providing a calibrated transmission channel which is closer to reciprocal with an un-calibrated reception channel than an un-calibrated transmission channel is.

Scenarios where reciprocity is desirable will be referred to as reciprocity scenarios herein, and other scenarios (i.e., scenarios where reciprocity is not of interest) will be referred to as non-reciprocity scenarios.

The second group of example embodiments relates to situations where determining respective beamforming calibration factors for the transceiver chains comprises determining respective beamforming calibration factors for the transmitter chains and/or determining respective beamforming calibration factors for the receiver chains, separately. Such situations may occur in reciprocity scenarios as well as in non-reciprocity scenarios.

An advantage of some embodiments is that approaches are provided for beamforming calibration of a multi-antenna transceiver.

An advantage of some embodiments is that the amount of signaling overhead due to over-the-air calibration signaling is adjustable.

An advantage of some embodiments is that the amount of signaling overhead due to over-the-air calibration signaling is reduced compared to over-the air signaling approaches of the prior art.

An advantage of some embodiments is that a trade-off possibility is provided between calibration accuracy and the amount of signaling overhead due to over-the-air calibration signaling.

An advantage of some embodiments is that approaches are provided which scales well when the number of antenna elements increases and/or when the number of transceiver chains to be calibrated increases.

FIG. 1 illustrates an example method 100 according to some embodiments. The method is a method of over-the-air (OTA) beamforming calibration for a multi-antenna transceiver having a first plurality, M, of antenna elements connected to respective transceiver chains.

In step 110, a second plurality, N, is determined of measurement intervals for calibration sounding. The second plurality is smaller than the first plurality, i.e., N<M.

Generally, as will be exemplified later herein, the second plurality, N, is determined such that the number of unknown parameters (values) of an expression for the calibration is not more than a number of measurements achievable from the second plurality of measurement intervals.

As illustrated by optional sub-step 111, the determination of the second plurality, N, may be based on traffic load.

For example, determining the second plurality may comprise selecting a relatively high value of N when the traffic load is relatively low and selecting a relatively low value of N when the traffic load is relatively high.

Put differently, determining the second plurality may comprise selecting a first size of the second plurality for a first traffic load of a communication system wherein the multi-antenna transceiver is operating, and selecting a second size of the second plurality for a second traffic load of the communication system. The first size is larger than the second size when the first traffic load is lower than the second traffic load, and vice versa.

An advantage of this approach is that when signaling overhead is not detrimental for system performance (i.e., for relatively low traffic load) a relatively high calibration quality may be achieved by increasing the signaling overhead for sounding (which enables increased orthogonality between sounding from different transceiver chains, and thereby higher calibration quality). Correspondingly, when signaling overhead is detrimental to system performance (i.e., for relatively high traffic load) a somewhat lower calibration quality may be accepted by decreasing the signaling overhead for sounding.

In some embodiments, the second plurality is smaller than the first plurality, i.e., N<M, only when the traffic load is higher than a traffic load threshold, and the second plurality is equal to the first plurality, i.e., N=M, when the traffic load is not higher than the traffic load threshold.

As illustrated by optional sub-step 112 (which may be applied alternatively or additionally to optional sub-step 111), the determination of the second plurality, N, may be based on the calibration measurement quality metric (e.g., in the form of a threshold value indicating an acceptable calibration quality).

The calibration quality metric may be any suitable metric (e.g., a signal-to-interference ratio, SIR, determined for one or more previous measurements).

For example, determining the second plurality may comprise selecting a relatively high value of N when the calibration measurement quality metric indicates relatively low calibration measurement quality and selecting a relatively low value of N when the calibration measurement quality metric indicates relatively high calibration measurement quality.

Put differently, determining the second plurality may comprise selecting a third size of the second plurality for a first calibration measurement quality metric, and selecting a fourth size of the second plurality for a second calibration measurement quality metric. The third size is larger than the fourth size when the first calibration measurement quality metric indicates lower calibration measurement quality than the second calibration measurement quality metric, and vice versa.

An advantage of this approach is that when the calibration measurement quality metric indicates relatively low calibration measurement quality (e.g., due to measurement conditions being relatively bad) acceptable calibration quality may be achieved anyway by increasing the signaling overhead for sounding (which enables increased orthogonality between sounding from different transceiver chains, and thereby higher calibration quality). Correspondingly, when the calibration measurement quality metric indicates relatively high calibration measurement quality (e.g., due to measurement conditions being relatively good) acceptable calibration quality may be achieved even if sounding signaling orthogonality is decreased, and thereby the signaling overhead can be decreased in such conditions.

In some embodiments, the second plurality is smaller than the first plurality, i.e., N<M, only when the calibration measurement quality metric indicates a calibration measurement quality which is higher than a calibration measurement quality threshold, and the second plurality is equal to the first plurality, i.e., N=M, when the calibration measurement quality metric indicates a calibration measurement quality which is not higher than the calibration measurement quality threshold.

For each measurement interval of the second plurality, one or more (e.g., one, two, or more) antenna elements of the first plurality is selected for sounding signal transmission, as illustrated by step 120. Each antenna element of the first plurality is selected for one or more (e.g., one and only one) of the measurement intervals of the second plurality. Thus, at least one interval has at least two antenna elements selected for sounding signal transmission.

In some embodiments, a transfer function (e.g., a transfer matrix) can be used to represent a relation between sounding signal transmission measurements and beamforming calibration factors.

Step 120 may comprise selecting antenna element(s) for each measurement interval for which the transfer function meets a condition, as illustrated by optional sub-step 121. For example, the condition may comprise the transfer matrix having one or more of the following properties: the lowest eigenvalue of the matrix being above a threshold value, the smallest eigenvalue of the matrix having a larger value than the respective smallest eigenvalues of one or more (e.g., all) other possible transfer matrices, a ratio between the highest and lowest eigenvalue of the matrix (the matrix condition number) being below a threshold value, and the ratio between largest and smallest eigenvalues of the matrix being smaller than the respective ratios between largest and smallest eigenvalues of one or more (e.g., all) other possible transfer matrices.

Alternatively or additionally, step 120 may comprise selecting antenna element(s) for each measurement interval that maximize a number of parameters in the transfer function, as illustrated by optional sub-step 122. For example, this may be achieved by letting the difference—between any two transmission intervals—of the number of selected antenna elements be either zero or one.

When two or more antenna elements are selected in step 120 for sounding signal transmission during a measurement interval, the selection may comprise selecting antenna elements having a mutual coupling that exceeds a mutual coupling threshold.

Thus, selection of two or more antenna elements for simultaneous sounding signal transmission is not restricted to antenna element pairs (or collections) having a mutual coupling that does not exceed a mutual coupling threshold. Contrarily, according to some embodiments, strongly coupled antenna elements may be for simultaneous sounding signal transmission. Put differently, selection of two or more antenna elements for simultaneous sounding signal transmission is non-exclusive of antenna element pairs (or collections) having a (substantial/significant) mutual coupling.

The value of the mutual coupling threshold may be any suitable value (e.g., a value representing a boundary between non-significant and significant mutual coupling).

Generally, when mutual coupling is referred to herein for a pair (or collection) of transmission antenna elements, the mutual coupling may be interpreted in relation to a (e.g., one, some, or all) non-selected antenna element (i.e., in relation to antenna element(s) intended to receive the simultaneous transmission of the selected antenna elements). For example, mutual coupling of two antenna elements may be defined in terms of the extent of interference experienced by receiving antenna element(s) between simultaneously transmitted sounding signal from the two antenna elements.

In step 130, respective sounding signals are transmitted by the selected one or more antenna elements during each measurement interval of the second plurality. The transmission of sounding signals by the selected antenna elements for a measurement interval is may be simultaneous.

In various embodiments, the transmission of sounding signals by the selected antenna elements for a measurement interval may use the same time resource(s).

In various embodiments, the transmission of sounding signals by the selected antenna elements for a measurement interval may use the same frequency resource(s).

In various embodiments, the transmission of sounding signals by the selected antenna elements for a measurement interval may use the same code resource(s).

In various embodiments, the transmission of sounding signals by the selected antenna elements for a measurement interval may use the same spatial resource(s).

In various embodiments, the transmission of sounding signals by the selected antenna elements for a measurement interval may use the same time and/or frequency and/or code and/or spatial resource(s).

In optional step 140, sounding signal transmission measurements are acquired by receiving, during each measurement interval of the second plurality and for each non-transmitting antenna element of the first plurality, a signal corresponding to the one or more transmitted respective sounding signals.

In optional step 150, respective beamforming calibration factors are determined for the transceiver chains of the antenna elements of the first plurality based on the received signals.

Channel estimation is performed in optional step 160.

In optional step 170, a communication signal is beamformed based on the channel estimation and based on the determined beamforming calibration factors.

In some embodiments (e.g., for a reciprocity scenario where a calibration factor represents the ratio of a receiver gain and a transmitter gain), step 160 may comprise performing reception channel estimation and step 170 may comprise computing a beamformer using un-calibrated reception channel estimates achieved in step 160 and applying the determined beamforming calibration factors to the computed beamformer.

In some embodiments (e.g., for a reciprocity scenario where a calibration factor represents the ratio of a transmitter gain and a receiver gain), step 160 may comprise performing reception channel estimation and step 170 may comprise applying the determined beamforming calibration factors to the un-calibrated reception channel (as estimated in step 160), and computing a beamformer using the calibrated reception channel estimates.

The beamformed communication signal is transmitted to the one or more other transceivers in optional step 180.

An example context in which the method 100 may be particularly applicable will now be introduced.

Some wireless communication standards (e.g., fifth generation new radio, 5G NR, advocated by the third generation partnership project, 3GPP) rely on spatial beamforming, typically realized by nodes (also referred to herein as wireless communication devices) equipped with a plurality of antennas (also referred to herein as a first plurality of antenna elements of a multi-antenna transceiver). When the number of antennas is large (e.g., many tens or more), the corresponding communication may be referred to as massive multiple input, multiple output (MIMO) communication.

One challenge of massively scaling MIMO communication is that explicit channel estimation can become very challenging. One reason may be that the corresponding signaling overhead typically scales linearly with the number of antennas (or the beamforming codebook size); including training signaling as well as channel state information (CSI) feedback signaling.

An approach for channel estimation (which is supported in 5G NR Release 15) is to rely on channel reciprocity and use reverse link (uplink or downlink) training signals to estimate forward link (downlink or uplink) channels and compute beamformers accordingly. For fully digital nodes (i.e., nodes with one transceiver chain per antenna), only one training signal per forward link stream is necessary for this approach. Thus, the signaling overhead for training is proportional to the number of forward link streams which is typically much smaller than the number of antennas. This approach may, for example, be useful in a multi-user (MU) MIMO context, where a fully digital base station with many antennas uses uplink channel estimates to beamform downlink data streams to user equipments.

However, even if the propagation channel (i.e., the radio channel) is considered to be reciprocal, analog front-end circuitry in the transmitting device and/or in the receiving device may render the baseband-to-baseband channel non-reciprocal. Therefore, calibration may be beneficial to achieve a baseband-to-baseband channel that is reciprocal, or at least closer to reciprocal than it would be without calibration. This beamforming calibration may be relevant for the first group of example embodiments and/or for the second group of example embodiments.

Calibration may also be beneficial when—instead of aiming for reciprocity—it is desired to separately calibrate the transmitter chains and/or the receiver chains of a node. This beamforming calibration may be relevant for the second group of example embodiments. One example motivation for desiring this type of calibration is that, with calibrated transmitter chains, it is possible to focus most of the transmit energy in a (physical) angle by creating a pencil beam (e.g., a discrete Fourier transform, DFT, beam).

As mentioned before, there exist various approaches for beamforming calibration of a multi-antenna transceiver (e.g., to get closer to baseband-to-baseband channel reciprocity). A first group of such approaches involves using an internal calibration network in the multi-antenna transceiver device, and a second group of such approaches involves over-the air (OTA) signaling.

Some implementations of beamforming calibration involves bi-directional OTA measurements between the involved nodes (i.e., the transmitting and receiving devices). The measurement set may be gathered at one node and used to estimate calibration coefficients for both transmitting and receiving nodes.

In other implementations of beamforming calibration, the entire calibration procedure is performed locally at the node to be calibrated. This can be achieved by local OTA measurements or by an internal calibration network.

Embodiments presented herein may be particularly relevant for beamforming calibration employing local OTA measurements. A mathematical description of an example context for beamforming calibration employing local OTA measurements will now be introduced.

This example context features a narrowband MIMO link with M antennas at one end (the transmitting node, "side A") and K antennas on the other end (the receiving node, "side B"). In the massive MIMO regime, M>>K.

Side A is a fully digital node and is capable to process all M signals (i.e., each signal from each antenna) in a joint fashion. For example, side A can be a network node (such as a base station, BS) or a fully digital user equipment (UE) with M antennas (wherein "fully digital" means having one transceiver chain per antenna element), and side B can be a K-antenna UE, K single-antenna UE:s, or several UE:s which together have a total of K antennas. In the following, it is assumed that side A is a BS and side B is K single-antenna UE:s.

The M×K uplink (UL) channel $H_{UL}$, (e.g., representing an orthogonal frequency division multiplexing, OFDM, subcarrier; a physical resource block, PRB; or a PRB group) may be modelled as $$H_{UL} = R_{BS} H T_{UE}, \quad (1)$$

where H represents the radio propagation channel, $T_{UE} = \text{diag}\{t_1^{UE}, \ldots, t_K^{UE}\}$ is a diagonal matrix which models the complex gains of the UE transmitter chains, and $R_{BS} = \text{diag}\{r_1^{BS}, \ldots, r_M^{BS}\}$ is a diagonal matrix which models the complex gains of the BS receiver chains. The associated downlink (DL) channel $H_{DL}$ may be modelled as $$H_{DL} = R_{UE} H^T T_{BS}, \quad (2)$$

where $T_{BS} = \text{diag}\{t_1^{BS}, \ldots, t_M^{BS}\}$ is a diagonal matrix which models the complex gains of the BS transmitter chains, and $R_{UE} = \text{diag}\{r_1^{UE}, \ldots, r_K^{UE}\}$ is a diagonal matrix which models the complex gains of the UE receiver chains.

Within a time/frequency coherence interval, the radio propagation channel can be assumed reciprocal in this example. However, the end-to-end channel is generally not reciprocal due to the gains (responses) of the transceiver circuitries. This makes it cumbersome to base DL transmission on UL reference signals. This problem can be addressed if the BS had some knowledge of the quantity $$C = \text{diag}\{c_1, \ldots, c_M\} = \alpha (T_{BS})^{-1} R_{BS} = \alpha \, \text{diag}\left\{\frac{r_1^{BS}}{t_1^{BS}}, \ldots, \frac{r_M^{BS}}{t_M^{BS}}\right\}, \quad (3)$$

where $\alpha$ denotes a complex-valued, not necessarily known, scaling term (i.e., if the BS knew $(T_{BS})^{-1} R_{BS}$ up to an arbitrary non-zero complex-valued scaling factor); which will be demonstrated in the following.

The BS can estimate $H_{UL}$, via UL reference signals. If the BS wants to perform zero-forcing (ZF) transmission to the UE:s, it may do so by the using the Moore-Penrose inverse of $H_{UL}^T$ in the precoding for beamforming, namely $$W = H_{UL}^* (H_{UL}^T H_{UL}^*)^{-1},$$

where ( )* denotes element-wise complex conjugation. Similar considerations apply in the case of linear minimum mean square error (MMSE) transmission, maximum ratio transmission (MRT), etc.

However, since W is constructed based on UL signals, it is generally not matched to the (typically non-reciprocal) DL channel $H_{DL}$. To mitigate this problem, the BS may multiply the precoded signal with an entry of C at each antenna. More specifically, the precoded signal at antenna m may be multiplied by $c_m$. Then, the DL effective channel can be expressed as $$H_{DL_{eff}} = H_{DL} C W =$$
$$H_{DL} C H_{UL}^* (H_{UL}^T H_{UL}^*)^{-1} = H_{DL} C R_{BS}^* H^* T_{UE}^* (T_{UE} H^T |R_{BS}|^2 H^* T_{UE}^*)^{-1} =$$
$$H_{DL} \alpha (T_{BS})^{-1} |R_{BS}|^2 H^* T_{UE}^* (T_{UE} H^T |R_{BS}|^2 H^* T_{UE}^*)^{-1} = H_{DL} \alpha (T_{BS})^{-1}$$
$$H^{-T} (T_{UE})^{-1} = \alpha R_{UE} H^T T_{BS} (T_{BS})^{-1} H^{-T} (T_{UE})^{-1} = \alpha R_{UE} (T_{UE})^{-1},$$

which is a diagonal matrix with unknown diagonal entries. The unknown diagonal entries can be estimated using only one DL reference signal, beamformed towards all UE:s, using the calibrated channels. Thus, K UL reference signals plus one DL reference signal are sufficient to conduct all training needed for this reciprocity-based transmission approach. This results in much less training overhead than explicit DL channel estimation of all pairs of antennas (DL beam sweeping), which would also require additional processing at the UE:s.

Thus, knowledge of $r_m^{BS}/t_m^{BS}$, m=1 . . . M enables DL transmission with no (or low) inter-user interference over what is effectively a calibrated (or close to calibrated) UL/DL channel setup, without using explicit calibration networks or node-to-node OTA calibration signals. The matrix C can be seen as a calibration matrix, and it is desired to estimate its diagonal elements (down to the unknown scaling factor $\alpha$).

The above may be seen as an example of each beamforming calibration factor representing a ratio between receiver path gain and transmitter path gain for a corresponding transceiver chain ratios $r_m^{BS}/t_m^{BS}$. It is also possible to let each beamforming calibration factor represent a ratio between transmitter path gain and receiver path gain for a corresponding transceiver chain ratios $t_m^{BS}/r_m^{BS}$. The latter calibration factors can, for example, be estimated by using the same approaches as exemplified herein while inverting every element of the matrix $Y_{cal}$.

The above beamforming calibration illustrates the first group of example embodiments.

In a beamforming calibration for the second group of example embodiments, estimates of the diagonal elements of $\alpha_t T_{BS}$ and/or $\alpha_r R_{BS}$ are desired instead. Based on such estimates, it is possible to compute calibration coefficients to mitigate the different gains between transmitter chains and/or receiver chains to improve beamforming transmission in physical angles. Generally, $\alpha_t$ and $\alpha_r$ are unknown non-zero complex scalars (i.e., only the amplitude differences between the transmitter chains and/or receiver chains is important, not their actual values).

One approach to estimation of the matrix C involves local OTA signalling in which the M antennas are sounded one-by-one by transmission of a sounding signal from each antenna and receiving on the other M−1 non-transmitting antennas (compare with part (b) of FIG. 2 as described later herein). Then, the received signals for all pairs of transmitting and non-transmitting antennas can be compactly written in a matrix from as $$Y_{cal} = R_{BS} H_c T_{BS} \tag{4}$$

where $H_c$ is the channel between transmitting and non-transmitting antennas, which may include effects related to mutual coupling between antennas. The diagonal entries of $H_c$, and consequently of $Y_{cal}$, are typically undefined for most practical cases (since a transceiver chain does not simultaneously transmit and receive in this scenario). This is assumed to be the case for the remaining exemplification herein. However, it should be noted that generalization to other situations is possible (i.e., when one or more of the diagonal entries of $H_c$, and consequently of $Y_{cal}$, is not undefined).

The measurement matrix $Y_{cal}$ can be re-written as $$Y_{cal} = R_{BS} H_c T_{BS} = R_{BS} H_c R_{BS} R_{BS}^{-1} T_{BS} = \frac{1}{\alpha} R_{BS} H_c R_{BS} C = PC, \tag{5}$$

where $P = R_{BS} H_c R_{BS}/\alpha$ is a symmetric matrix with undefined diagonal elements. Thus, the number of defined parameters in P is $(M^2-M)/2$, the number of relevant, non-zero, parameters in the diagonal matrix C is M, and the measurement matrix $Y_{cal}$ has $M^2-M$ observations. Since $M^2-M \geq M+(M^2-M)/2$, the above measurement procedure provides a measurement set that is sufficiently large to estimate the calibration coefficients, i.e., the calibration matrix C. Estimating the calibration coefficients based on the observation matrix $Y_{cal}$ may, generally, be performed using any suitable approach. This calibration estimation illustrates the first group of example embodiments.

In a calibration estimation for the second group of example embodiments, the sounding procedure described above for equation (4) can be used to obtain measurements for estimation of $\alpha_t T_{BS}$ and/or $\alpha_r R_{BS}$. However, knowledge of the channel $H_c$ is also needed in this case. In practice, $H_c$ is typically dominated by mutual coupling effects. Therefore, $H_c$ may be estimated by measuring the mutual coupling between antenna pairs (e.g., offline in a laboratory setup, such as an anechoic chamber).

The number of columns of $Y_{cal}$ (which is M in the case where all sounding signals are transmitted in orthogonal resources, e.g., at different points in time) equals the number of OTA signaling resources needed to carry out the calibration procedure. The sounding to acquire $Y_{cal}$ typically needs to be repeatedly executed online (e.g., once every couple of seconds; depending on the drifts of the hardware response). The calibration signaling overhead can be a bottleneck in some situations (e.g., when the procedure is for enabling reciprocity-based operation for multiple-antenna nodes). Thus, any approach that enable a decrease of the signaling overhead may be beneficial, in particular if an acceptable calibration quality is maintained. This is an object of some embodiments disclosed herein.

According to some embodiments, an OTA measurement procedure is applied where, for each of one or more (e.g., one, some, or all) sounding resources, more than one transmitter (e.g., two, three, or more) transmit sounding signals using the same transmission resource (e.g., time, frequency, code, spatial, etc.). For such sounding resources, the receivers will experience a super-position of the transmitted sounding signals. Various possible criteria are presented herein for specifying which transmitters should be transmitting using the same transmission resource, and which transmitters should be transmitting using their own transmission resource. Furthermore, example algorithms are presented herein for processing the received measurements (where some observations comprise a super-position of several transmitted signals) to estimate the calibration parameters (e.g., the matrix C).

Thus, instead of having each antenna sounding the channel at orthogonal (e.g., non-simultaneous) transmission/measurement resources, some embodiments employ a procedure where multiple antennas sound the channel using the same transmission/measurement resource. This reduces the overall signaling overhead. Then, the new system model becomes (compare with equation (4))

$$Y'_{cal} = R_{BS} H_c T'_{BS} + N, \tag{6}$$

where the M×N matrix $T'_{BS}$ (N<M, where N corresponds to the second plurality of measurement resources) replaces the square M×M matrix $T_{BS}$ of equation (4). The matrix N models additive receiver noise, and may be set to zero in some situations. The resulting overhead reduction for calibration signaling is 1−N/M. The columns of $T'_{BS}$ have the same number of non-zero entries as $T_{BS}$. For example, if M=7 and N=5 (i.e., 5 resources are used to sound 7 channels and calibrate 7 transceiver chains), one possible setting for $T'_{BS}$ is $$T_{BS}^{\prime\{2,2,1,1,1\}} = \begin{bmatrix} t_1 & 0 & 0 & 0 & 0 \\ t_2 & 0 & 0 & 0 & 0 \\ 0 & t_3 & 0 & 0 & 0 \\ 0 & t_4 & 0 & 0 & 0 \\ 0 & 0 & t_5 & 0 & 0 \\ 0 & 0 & 0 & t_6 & 0 \\ 0 & 0 & 0 & 0 & t_7 \end{bmatrix} \tag{7}$$

Thus, in this example, the first and second transmitters sound the channel simultaneously using the first transmission resource (represented by the first column in (7)), the third and fourth transmitters sound the channel simultaneously using the second transmission resource (represented by the second column in (7)), the fifth transmitter sounds the channel using the third transmission resource (represented by the third column in (7)), the sixth transmitter sounds the channel using the fourth transmission resource (represented by the fourth column in (7)), and the seventh transmitter sounds the channel using the fifth transmission resource (represented by the fifth column in (7)). The notation {2,2, 1,1,1} will be used herein to denote such a selection. The measurement matrix becomes $$Y_{cal}'^{(2,2,1,1,1)} = \begin{bmatrix} X & y_6 & y_{11} & y_{17} & y_{23} \\ X & y_7 & y_{12} & y_{18} & y_{24} \\ y_1 & X & y_{13} & y_{19} & y_{25} \\ y_2 & X & y_{14} & y_{20} & y_{26} \\ y_3 & y_8 & X & y_{21} & y_{27} \\ y_4 & y_9 & y_{15} & X & y_{28} \\ y_5 & y_{10} & y_{16} & y_{22} & X \end{bmatrix} \quad (8)$$

where X refers to an undefined entry (assuming that no antenna is transmitting and receiving using the same transmission/measurement resource). Re-writing equation (6) in a similar manner as equation (5) results in the following new model for reciprocity calibration:

$$Y_{cal}'^{(2,2,1,1,1)} = P^{(2,2,1,1,1)} C^{(2,2,1,1,1)} + N, \quad (9)$$

where $$P^{(2,2,1,1,1)} = \begin{bmatrix} X & X & p_1 & p_2 & p_3 & p_4 & p_5 \\ X & X & p_6 & p_7 & p_8 & p_9 & p_{10} \\ p_1 & p_6 & X & X & p_{11} & p_{12} & p_{13} \\ p_2 & p_7 & X & X & p_{14} & p_{15} & p_{16} \\ p_3 & p_8 & p_{11} & p_{14} & X & p_{17} & p_{18} \\ p_4 & p_9 & p_{12} & p_{15} & p_{17} & X & p_{19} \\ p_5 & p_{10} & p_{13} & p_{16} & p_{18} & p_{19} & X \end{bmatrix}$$

and $$C^{(2,2,1,1,1)} = \begin{bmatrix} c_1 & 0 & 0 & 0 & 0 \\ c_2 & 0 & 0 & 0 & 0 \\ 0 & c_3 & 0 & 0 & 0 \\ 0 & c_4 & 0 & 0 & 0 \\ 0 & 0 & c_5 & 0 & 0 \\ 0 & 0 & 0 & c_6 & 0 \\ 0 & 0 & 0 & 0 & c_7 \end{bmatrix}.$$

It is generally possible to estimate the non-zero parameters in C from the reduced measurement set $Y'_{cal}$ when the number of measurements (i.e., the number of defined entries of $Y'_{cal}$; here, 28) is not less than the number of unknowns (i.e., the number of non-zero elements of C plus the number of defined entries of P; here, 7+19=26). Thus, determining N (compare with step 110 of FIG. 1) is conditioned on that the maximum overhead reduction 1−N/M (i.e., the minimum N; $N_{min}$) is defined by a situation where the number of measurements equal to the number of unknowns. Put differently, the second plurality should be selected such that the system of linear equations is solvable according to these embodiments.

This may be seen as an example of an approach for determining the second plurality, which is illustrated by optional sub-step 113 of FIG. 1.

According to this approach and for the first group of embodiments, determining the second plurality is conditioned on that a number of sounding signal transmission measurements achievable during the second plurality of measurement intervals (e.g., the number of defined entries of $Y'_{cal}$; M(N−1) if each antenna element is sounded only once) is larger than, or equal to, a sum of a number of beamforming calibration factors to be determined (e.g., the number of non-zero elements of C; M) and a number of parameters of the first transfer function (e.g., the number of defined entries of P). The number of defined entries of P may be expressed as $(M^2 - \Sigma_{n=1}^{N} L_n^2)/2$, where $L_n$ is the number of transmitters using transmission resource n (i.e., the number transmitters activated for resource n).

According to this approach and for the second group of embodiments, determining the second plurality is conditioned on that a number of sounding signal transmission measurements achievable during the second plurality of measurement intervals is larger than, or equal to, a sum of a number of beamforming calibration factors to be determined (e.g., the number of relevant elements of $T_{BS}$ plus the number of relevant elements of $R_{BS}$; typically 2M when the relevant elements are $t_m^{BS}$ and $r_m^{BS}$).

The second plurality, N, may be varied in the interval [$N_{min}$, M] depending on other criteria, as suitable. For example, traffic load and/or the quality of the calibration may be used as criteria as described above.

For example, if the calibration quality does not satisfy a quality threshold, the node may increase the current setting of N by x, x≥1. If the calibration quality thereafter still does not satisfy the quality threshold, N may be increased further until the quality threshold is satisfied or N=M.

The quality threshold may, for example, be based on the number of devices (UE:s) that are being serving by a MU-MIMO DL transmission, and/or the type of beamformer the transmitting node is using. Typically, the calibration quality is required to be higher the more users are simultaneously spatially multiplexed. Also typically, spatial interference suppression methods (e.g., ZF precoding) require higher calibration quality than, for example, maximum ratio transmission (MRT).

Since the system model of equation (9) is a linear model, it can be re-written by means of a column vector, $y'_{cal}$, which is constructed by stacking the columns of $Y'_{cal}$ one-by-one while removing the undefined entries (i.e., the entries with X in (8)):

$$y'_{cal}{}^{\{2,2,1,1,1\}} = P_{eq}{}^{\{2,2,1,1,1\}} c + n \quad (10)$$

where $c = [c_1 \ldots c_M]^T$ is a column vector with the calibration coefficients and $$P_{eq}^{(2,2,1,1,1)} = \begin{bmatrix} p_1 & p_6 & 0 & 0 & 0 & 0 & 0 \\ p_2 & p_7 & 0 & 0 & 0 & 0 & 0 \\ p_3 & p_8 & 0 & 0 & 0 & 0 & 0 \\ p_4 & p_9 & 0 & 0 & 0 & 0 & 0 \\ p_5 & p_{10} & 0 & 0 & 0 & 0 & 0 \\ 0 & 0 & p_1 & p_2 & 0 & 0 & 0 \\ 0 & 0 & p_6 & p_7 & 0 & 0 & 0 \\ 0 & 0 & p_{11} & p_{14} & 0 & 0 & 0 \\ 0 & 0 & p_{12} & p_{15} & 0 & 0 & 0 \\ 0 & 0 & p_{13} & p_{16} & 0 & 0 & 0 \\ 0 & 0 & 0 & 0 & p_3 & 0 & 0 \\ 0 & 0 & 0 & 0 & p_8 & 0 & 0 \\ 0 & 0 & 0 & 0 & p_{11} & 0 & 0 \\ 0 & 0 & 0 & 0 & p_{14} & 0 & 0 \\ 0 & 0 & 0 & 0 & p_{17} & 0 & 0 \\ 0 & 0 & 0 & 0 & p_{18} & 0 & 0 \\ 0 & 0 & 0 & 0 & 0 & p_4 & 0 \\ 0 & 0 & 0 & 0 & 0 & p_9 & 0 \\ 0 & 0 & 0 & 0 & 0 & p_{12} & 0 \\ 0 & 0 & 0 & 0 & 0 & p_{15} & 0 \\ 0 & 0 & 0 & 0 & 0 & p_{17} & 0 \\ 0 & 0 & 0 & 0 & 0 & p_{19} & 0 \\ 0 & 0 & 0 & 0 & 0 & 0 & p_5 \\ 0 & 0 & 0 & 0 & 0 & 0 & p_{10} \\ 0 & 0 & 0 & 0 & 0 & 0 & p_{13} \\ 0 & 0 & 0 & 0 & 0 & 0 & p_{16} \\ 0 & 0 & 0 & 0 & 0 & 0 & p_{18} \\ 0 & 0 & 0 & 0 & 0 & 0 & p_{19} \end{bmatrix} \quad (11)$$

The above may be seen as an illustration of beamforming calibration comprising determining respective beamforming calibration factors, c, for the transceiver chains of the antenna elements of the first plurality based on sounding signal transmission measurements, $y'_{cal}$, and wherein a first transfer function, $P_{eq}$, defines a relation between the sounding signal transmission measurements and the beamforming calibration factors.

Generally, changing the transmitter settings effectively results only in a change of the matrix $P_{eq}$, while the vector c remains unchanged. Thus, when choosing which transmitter setting to use (i.e., which antennas should transmit using the same resource; compare with step 120 of FIG. 1), only the properties of $P_{eq}$ need to be considered. This approach illustrates the first group of example embodiments.

In an approach for the second group of example embodiments, it can be seen that—using the same sounding as in equation (7)—there are 28 measurements to use for calibration estimation of 7 transmitter chains and 7 receiver chains (i.e., 14 parameters in total). Thus, the same type of measurement procedure with reduced overhead also allows for estimation of calibration coefficients in these embodiments, possibly with an adjusted value of $N_{min}$.

Selecting—for each of the N transmission resources—which antennas should transmit using that resource (compare with step 120 of FIG. 1), may be performed using any suitable approach. A few example approaches will be described in the following.

When M−N=0 there is effectively only one selectable transmitter setting, i.e., each transmitter uses a respective (distinct) transmission resource. Changing the order in which the transmitters are activated in this case results in the same system model apart from corresponding row and/or columns permutations. When M−N>0, however, there are more than one selectable transmitter settings.

One approach to selecting transmitter setting (compare with step 120 of FIG. 1), comprises selecting a transmitter setting for which the applicable system matrix (e.g., $P_{eq}$ for the first group of example embodiments) is well conditioned. This typically provides for good calibration performance.

When there is prior knowledge available (e.g., when the node has an estimate of the non-zero parameters of $P_{eq}$), such knowledge can be used for the selection of transmitter setting. For example, when the node performs calibration repetitively and/or periodically (e.g., every couple of second) and the parameter drift is moderate between calibration events, the previous parameter estimates—although not perfect—can be used for selection of transmitter setting.

Thus, the node may use previous estimates of the parameters $\{p_1, p_2, \ldots\}$ to compute properties of $P_{eq}$ for different possible transmitter settings, and then select a transmitter setting with acceptable (e.g., best) properties. In some embodiments all possible transmitter settings is considered. In some embodiments possible transmitter settings are considered one by one until a transmitter setting with acceptable properties is found.

For example, if N=5 and M=7, then there is one distinct $P_{eq}$ for the combination {2,2,1,1,1}, one distinct $P_{eq}$ for the combination {2,1,1,2,1}, one distinct $P_{eq}$ for the combination {3,1,1,1,1}, etc. The node may evaluate resulting matrices properties for all $$\binom{5}{2}+\binom{5}{1}=15$$

transmitter combinations, and decide which transmitter setting to select based on the evaluation result, or the node may stop the evaluation process when a transmitter setting with acceptable properties (e.g., defined by a threshold value) is found.

The above approach is applicable for the first group of example embodiments.

In an approach for the second group of example embodiments, the same principle can be used. In these embodiments, the node may have knowledge (e.g., from prior estimates) of $T'_{BS}$ and $R_{BS}$, and use these values to evaluate relevant system properties for the purpose of selecting transmitter setting. For example, equation (10) can be written as $$y'_{cal}{}^{\{2,2,1,1,1\}}=Z_{eq}{}^{\{2,2,1,1,1\}}t+n$$

where $t=[t_1 \ldots t_M]^T$ and $Z_{eq}{}^{\{2,2,1,1,1\}}$ is a matrix constructed from $R_{BS}$ and $H_c$. Different transmitter settings will give different $Z_{eq}$ matrices, similarly as above for $P_{eq}$. Thus, different transmitter settings may be evaluated for selection based on the properties of the corresponding $Z_{eq}$ matrix.

The above may be seen as an illustration of beamforming calibration comprising determining respective beamforming calibration factors, t, for the transceiver chains of the antenna elements of the first plurality based on sounding signal transmission measurements, $y'_{cal}$, wherein the sounding signal transmission measurements is a function of the beamforming calibration factors, $R_{BS}$ and t, and mutual couplings between the antenna elements of the first plurality, $H_c$. Put differently, a second transfer function, $Z_{eq}$, defines a relation between the sounding signal transmission measurements $y'_{cal}$, and the beamforming calibration factors, t, for the transmitter chains, wherein the second transfer function is based on the beamforming calibration factors, $R_{BS}$, for the receiver chains and the mutual couplings between the antenna elements of the first plurality, $H_c$.

The approaches above may be seen as examples of determining whether a candidate transfer function (e.g., a first transfer function, $P_{eq}$, or a second transfer function, $Z_{eq}$) meets a transfer function condition (e.g., has acceptable matrix properties) when selecting antenna elements for sounding signal transmission (compare with 120 and 121 of FIG. 1), wherein the determination may be based on an estimation of transfer function parameters determined during a previous beamforming calibration.

Generally, example acceptable matrix properties may relate to one or more of the lowest eigenvalue of the matrix being above a threshold value (i.e., a smallest eigenvalue of the transfer function being larger than an eigenvalue threshold), the smallest eigenvalue of the transfer function having a larger value than the respective smallest eigenvalues of one or more (e.g., all) other possible transfer functions, a ratio between the highest and lowest eigenvalue of the matrix (the matrix condition number) being below a threshold value (i.e., a ratio between largest and smallest eigenvalues of the transfer function being smaller than an eigenvalue ratio threshold), and the ratio between largest and smallest eigenvalues of the transfer function being smaller than the respective ratios between largest and smallest eigenvalues of one or more (e.g., all) other possible transfer functions.

When prior knowledge is not available, the above approaches may not be applicable. This can, for example, be the case for a first time calibration (after booting up), and/or when previous estimates are not suitable for some reason (e.g., when a relatively long time has passed since the previous calibration).

In a possible approach for such situations (which may, according to some embodiments, also be applied when there is prior knowledge available), the node selects a transmitter setting in which the maximum number of transmitters using the same transmission resource is minimized (i.e., the transmitters are "spread out" as evenly as possible among the transmission resources). A mathematical formulation of this approach is $$\{L_1, \ldots, L_N\}^* = \underset{\substack{\{L_1,\ldots,L_N\} \\ s.t.\ \Sigma L_n = M}}{\operatorname{argmin}} \max\{L_1, \ldots, L_N\}, \quad (12)$$

where $L_n$ is the number of transmitters using transmission resource n, and $M-N \geq L_n \geq 1$.

This may be seen as an example of letting the selection of antenna elements for sounding signal transmission be conditioned on that the number of selected antenna elements for a measurement interval differs by at most an absolute value of one from the number of antenna elements selected for simultaneous sounding signal transmission during any of the other measurement intervals of the second plurality (compare with 120 and 122 of FIG. 1). Thus, the difference—between any two transmission intervals—of the number of selected antenna elements is either zero or one.

For example, when N=5 and M=7, any of the 10 transmission settings which activate a maximum of 2 transmitters for each transmission resource is a solution for the above criterion (i.e., the transmitter settings {2,1,1,2,1}, {2,2,1,1,1}, etc. are usable, but not the transmitter setting {1,3,1,1,1}).

Generally, transmitters using the same transmission resource will typically be associated lower calibration quality that other transmitters. Adverse effects of this fact may be mitigated by employing a rotation scheme among transmitter settings (e.g., for a number of consecutive calibration instances) to attempt to maintain the same average calibration quality over time for the different transceiver chains. To achieve this, the rotation scheme may, for example, define a cycle which meets the criterion that—in a full cycle—all transmitters have been activated in isolation the same number of times.

For example, when N=5 and M=7, a rotation scheme could be implemented as a cycle containing {2,2,1,1,1}, {1,1,2,2,1}, {1,2,2,1,1}, {1,1,1,2,2}, and {2,1,1,1,2}. Of course, other cycles are also possible to obtain a similar purpose.

Once measurements have been made based on the selected sounding setup, the calibration factors may be determined based on the measurements (compare with step 150 of FIG. 1). The calibration factors may be determined using any suitable approach.

The following is an example approach to estimating the calibration parameter vector c as well as the parameters $p=[p_1, p_2, \ldots]$ when $M-N \geq 1$. An estimation of p may, for example, be useful in subsequent selections of transmitter settings as described above.

The system model of equation (10) can be equivalently written as $$y'_{cal}{}^{\{2,2,1,1,1\}} = C p_{eq}{}^{\{2,2,1,1,1\}} + n$$

where the column vector $p_{eq}{}^{\{2,2,1,1,1\}}$ is constructed by stacking all non-zero parameters of $P_{eq}{}^{\{2,2,1,1,1\}}$. Under a least squares formulation, $P_{eq}$ and c are sought which minimize the squared Frobenious norm of the residuals $\|y'_{cal} - C p_{eq}\|^2$ or (equivalently)$\|y'cat - P_{eq} c\|^2$. It may be cumbersome (or impossible) to find a closed-form solution since the cost function is not quadratic on the joint parameter space (composed of $P_{eq}$ and c). However, by assuming one part of the parameter space (e.g., $P_{eq}$) to be known (i.e., fixing that part of the parameter space), a closed-form solution exists for the remaining part of the parameter space (e.g., c). Such a solution may be represented by $\hat{c} = P_{eq}{}^\dagger y'_{cal}$, where $P_{eq}{}^\dagger$ denotes the Moore-Penrose inverse of $P_{eq}$.

Iterating this procedure with alternatingly fixing $P_{eq}$ and c to its previously closed-form solution $\hat{P}_{eq,(n)}$ and $\hat{c}_{(n)}$, respectively, results in one approach for achieving increasingly better estimations of $P_{eq}$ and c. More specifically, letting the estimates obtained for the $n^{th}$ iteration of this alternating procedure be denoted by $\hat{c}_{(n)}$ and $\hat{P}_{eq,(n)}$, the estimates for iteration n+1 may be obtained via the following two steps: $\hat{c}_{(n+1)} = (\hat{P}_{eq,(n)})^\dagger y'_{cal}$ and $\hat{p}_{eq,(n+1)} = \hat{C}_{(n+1)} y_{cal}$.

The iterative procedure is guaranteed to converge since it can be shown that $\|y'_{cal} - \hat{P}_{eq,(n)} c_{(n)}\|^2 \leq \|y'_{cal} - \hat{P}_{eq,(n+1)} c_{(n+1)}\|^2$. This approach is applicable for the first group of example embodiments.

In an approach for the second group of example embodiments, a similar technique of alternatingly estimating $T'_{BS}$ and $R_{BS}$ may be used. Then, the cost function to minimize with respect to $T'_{BS}$ and $R_{BS}$ may be expressed as $\|Y'_{cal} - R_{BS} H_c T'_{BS}\|^2$ ($H_c$ is assumed to be known as mentioned before).

Figure 2:
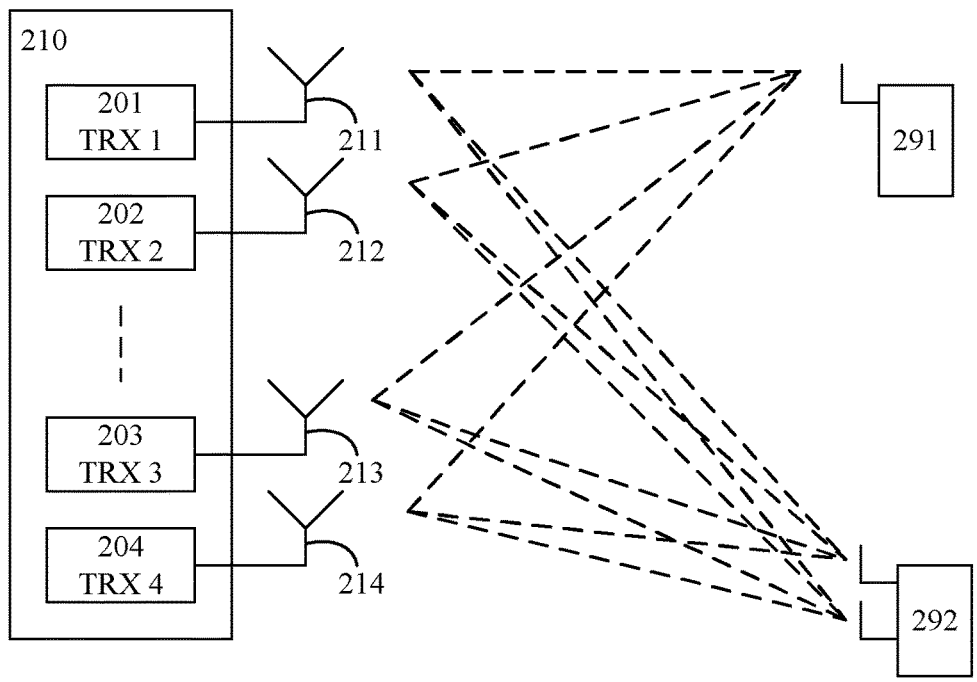
FIG. 2 is a collection of schematic block diagrams illustrating example scenarios according to some embodiments.
Figure 2:
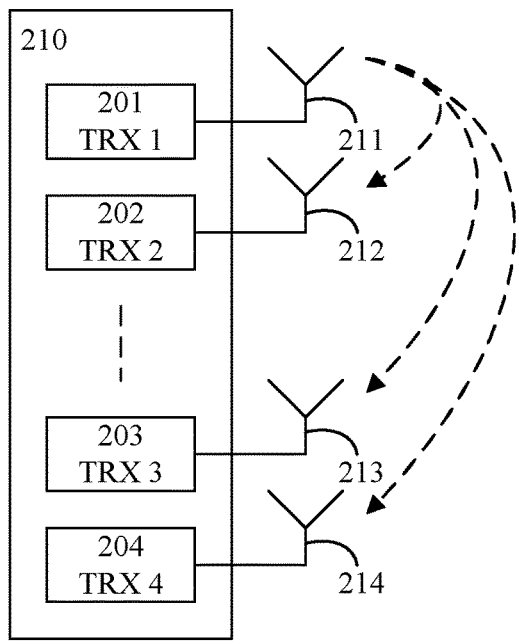
Figure 2:
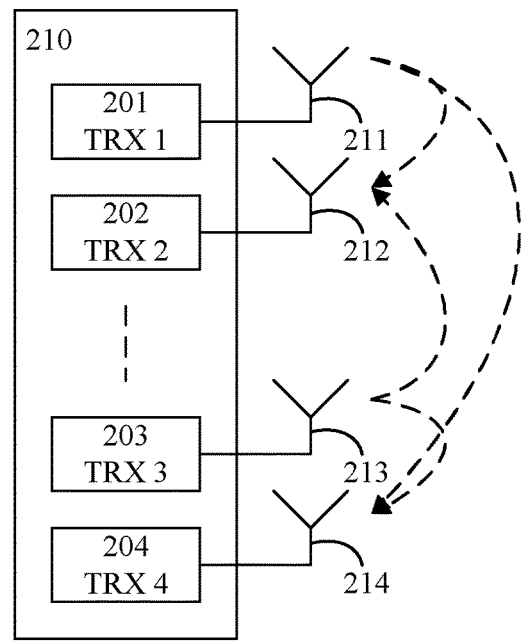

FIG. 2 is a collection of schematic illustrations of some example scenarios according to some embodiments.

Part (a) of FIG. 2 schematically illustrates an example communication scenario wherein some embodiments may be useful. This scenario shows a multi-antenna transceiver 210 (e.g., a multi-antenna transceiver of a network node, such as a base station) configured to communicate with one or more other transceivers 291, 292 (e.g., user equipments). The multi-antenna transceiver 210 has a plurality of transceiver chains (TRX 1, TRX 2, TRX 3, TRX 4) 201, 202, 203, 204, each of which is connectable to respective antenna element 211, 212, 213, 214 of the multi-antenna transceiver. FIG. 2 also schematically illustrates by means of dashed lines the radio channel between each pair of an antenna element of the multi-antenna transceiver 210 and an antenna element of any of the other transceivers 291, 292.

When beamformed communication is intended to take place (e.g., in a scenario such as that of FIG. 2), characteristics of the radio channels are typically acquired and used to determine a suitable beamforming setting. However, the effective communication channel is typically affected, not only by the radio channel conditions, but also by characteristics of the transceiver chains in the transmitting device (e.g., 210) and the receiving device (e.g., 291, 292). Therefore, knowledge (or estimation) of transceiver chain characteristics may improve the determination of a suitable beamforming setting. Typically, transceiver chain characteristics are used to calibrate the beamforming.

Embodiments disclosed herein provides a determination of transceiver chain characteristics for a multi-antenna transceiver in the form of respective beamforming calibration factors for the transceiver chains. This is achieved by over-the-air (OTA) beamforming calibration signaling.

Part (b) of FIG. 2 schematically illustrates an example approach to OTA signaling for beamforming calibration. In this approach, one (and only one) antenna element 211 transmits a sounding signal in a measurement interval, and the other antenna elements 212, 213, 214 perform measurements on the sounding signal. The process is repeated such that all antenna elements gets to transmit a sounding signal based on a one-to-one mapping between transmitting antenna element and measurement interval. This approach may be seen as a representation of an approach where the second plurality is equal to the first plurality, i.e., N=M.

Part (c) of FIG. 2 schematically illustrates an alternative example approach to OTA signaling for beamforming calibration. In this approach, two (or more) antenna elements 211, 213 simultaneously transmit sounding signals in a measurement interval, and the other antenna elements 212, 214 perform measurements on the sounding signals. The process is repeated such that all antenna elements gets to transmit a sounding signal based on a many-to-one mapping between transmitting antenna element and measurement interval. This approach may be seen as a representation of an approach where the second plurality is smaller than the first plurality, i.e., N<M.

Some approaches apply a combination of parts (b) and (c) of FIG. 2. In such an approach, one or more measurement intervals may have a single antenna element transmitting a sounding signal as illustrated by part (b) and the other measurement intervals may have two or more antenna elements transmitting sounding signals as illustrated by part (c). Thus, at least one interval has at least two antenna elements selected for sounding signal transmission.

Figure 3:
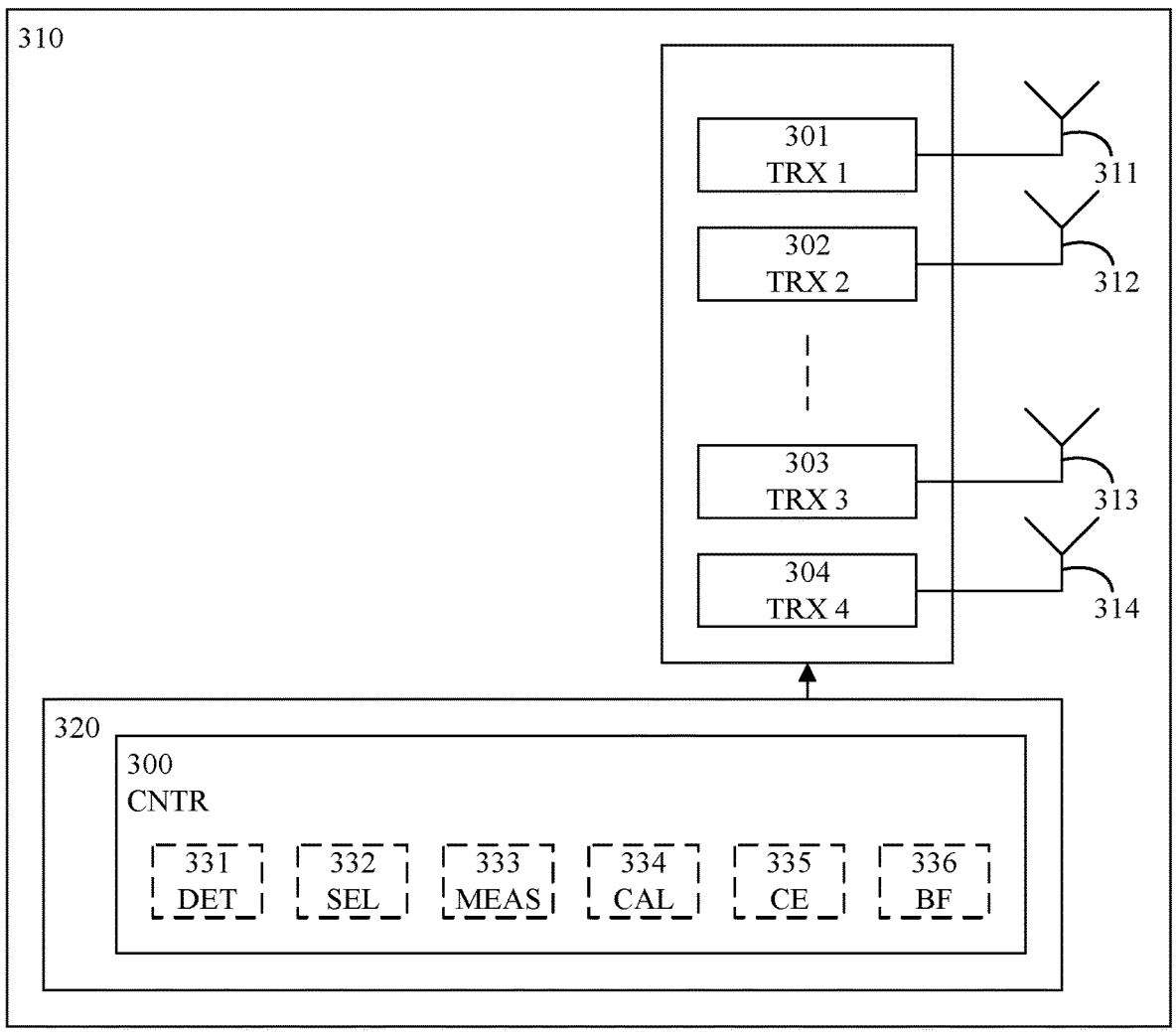
FIG. 3 is a schematic block diagram illustrating an example apparatus according to some embodiments.

FIG. 3 schematically illustrates an example apparatus 320 according to some embodiments. The apparatus 320 is for over-the-air beamforming calibration of a multi-antenna transceiver 310 (compare with 210 of FIG. 2) having a first plurality of antenna elements 311, 312, 313, 314 connected to respective transceiver chains (TRX) 301, 302, 303, 304.

The apparatus 320 may be comprised in the multi-antenna transceiver 310 as illustrated in FIG. 3, or may be otherwise associated with (e.g., connected, or connectable, to) the multi-antenna transceiver 310. Furthermore, the multi-antenna transceiver 310 and/or the apparatus 320 may be comprised in a wireless communication device (e.g., a network node, such as a base station).

The apparatus comprises a controller (CNTR; e.g., controlling circuitry or a control module) 300. The controller 300 may, for example, be configured to cause execution (e.g., be configured to execute) one or more steps of the example method of FIG. 1. Any feature described in connection with FIG. 1 may be equally applicable for the apparatus of FIG. 3 even if not explicitly mentioned below.

The controller 300 is configured to cause determination of a second plurality of measurement intervals for calibration sounding, wherein the second plurality is smaller than the first plurality (compare with 110 of FIG. 1).

To this end, the controller may comprise, or be otherwise associated with (e.g., connected, or connectable, to) a determiner (DET; e.g., determining circuitry or a determination module) 331. The determiner may be configured to determine the second plurality of measurement intervals for calibration sounding, wherein the second plurality is smaller than the first plurality.

The controller 300 is also configured to cause (for each measurement interval of the second plurality) selection of one or more antenna elements of the first plurality for sounding signal transmission, wherein each antenna element of the first plurality is selected for one of the measurement intervals of the second plurality (compare with 120 of FIG. 1).

To this end, the controller may comprise, or be otherwise associated with (e.g., connected, or connectable, to) a selector (SEL; e.g., selecting circuitry or a selection module) 332. The selector may be configured to select (for each measurement interval of the second plurality) one or more antenna elements of the first plurality for sounding signal transmission.

The controller 300 is also configured to cause (during each measurement interval of the second plurality) simultaneous transmission of respective sounding signals by the selected one or more antenna elements (compare with 130 of FIG. 1).

To this end, the controller may comprise, or be otherwise associated with (e.g., connected, or connectable, to) a transmitter (e.g., transmitting circuitry or a transmission module). The transmitter may be configured to transmit the respective sounding signals. Typically, the transmitter comprises the transmitter chain(s) of the selected antenna elements (e.g., the transmitter chains of transceivers 301 and 303 when antenna elements 311 and 313 were selected; compare with part (c) of FIG. 2).

The controller 300 may be further configured to cause acquisition of sounding signal transmission measurements by causing reception, during each measurement interval of the second plurality and for each non-transmitting antenna element of the first plurality, of a signal corresponding to the one or more transmitted respective sounding signals (compare with 140 of FIG. 1).

To this end, the controller may comprise, or be otherwise associated with (e.g., connected, or connectable, to) a receiver (e.g., receiving circuitry or a reception module). The receiver may be configured to receive the signal corresponding to the one or more transmitted respective sounding signals. Typically, the receiver comprises the receiver chain(s) of the non-selected antenna elements (e.g., the receiver chains of transceivers 302 and 304 when antenna elements 311 and 313 were selected; compare with part (c) of FIG. 2).

Also to this end, the controller may comprise, or be otherwise associated with (e.g., connected, or connectable, to) a measurer (MEAS; e.g., measuring circuitry or a measurement module) 333. The measurer may be configured to acquire the sounding signal transmission measurements.

The controller 300 may be further configured to cause determination of respective beamforming calibration factors for the transceiver chains of the antenna elements of the first plurality based on the received signals (compare with 150 of FIG. 1).

To this end, the controller may comprise, or be otherwise associated with (e.g., connected, or connectable, to) a calibrator (CAL; e.g., calibrating circuitry or a calibration module) 334. The calibrator may be configured to determine the respective beamforming calibration factors.

The controller 300 may be further configured to cause performance of channel estimation (compare with 160 of FIG. 1).

To this end, the controller may comprise, or be otherwise associated with (e.g., connected, or connectable, to) a channel estimator (CE; e.g., channel estimating circuitry or a channel estimation module) 335. The channel estimator may be configured to perform the channel estimation.

The controller 300 may be further configured to cause beamforming of a communication signal based on the channel estimation and based on the determined beamforming calibration factors (compare with 170 of FIG. 1).

To this end, the controller may comprise, or be otherwise associated with (e.g., connected, or connectable, to) a beamformer (BF; e.g., beamforming circuitry or a beamformer module) 336. The beamformer may be configured to beamform the communication signal.

The controller 300 may be further configured to cause transmission of the communication signal to the one or more other transceivers (compare with 180 of FIG. 1).

To this end, the controller may comprise, or be otherwise associated with (e.g., connected, or connectable, to) a transmitter (e.g., transmitting circuitry or a transmission module). The transmitter may be configured to transmit the communication signal. Typically, the transmitter comprises the transmitter chains of the transceivers 301, 302, 303, 304.

Figure 4:
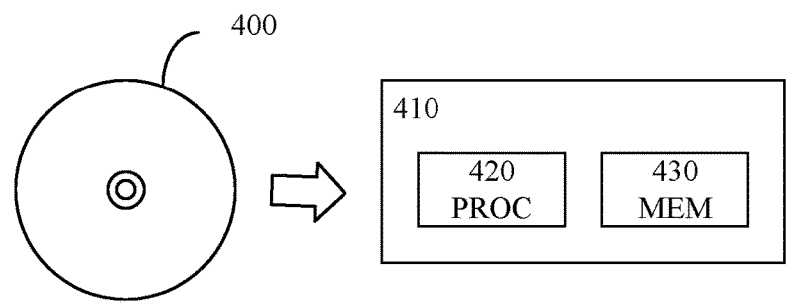
FIG. 4 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit) 420, which may, for example, be comprised in a wireless communication device (e.g., a network node) 410. When loaded into the data processor, the computer program may be stored in a memory (MEM) 430 associated with or comprised in the data processor. According to some embodiments, the computer program may, when loaded into and run by the data processor, cause execution of method steps according to, for example, any of the methods illustrated in FIG. 1 or otherwise described herein.

Figure 5:
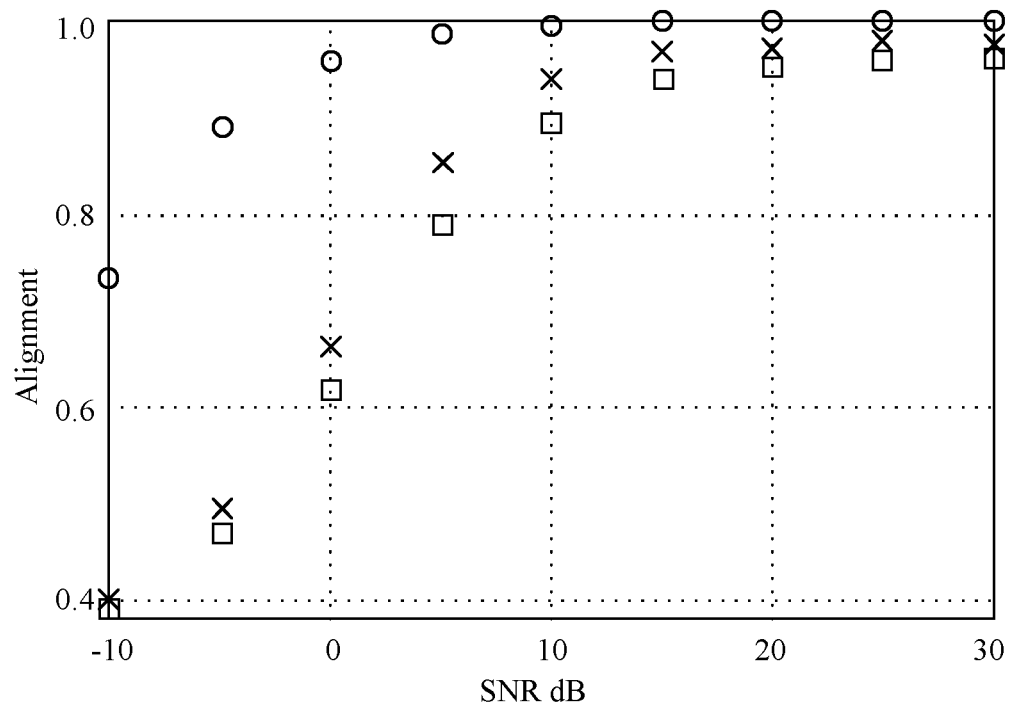
FIG. 5 is a simulation plot illustrating example results achievable according to some embodiments.
Figure 6:
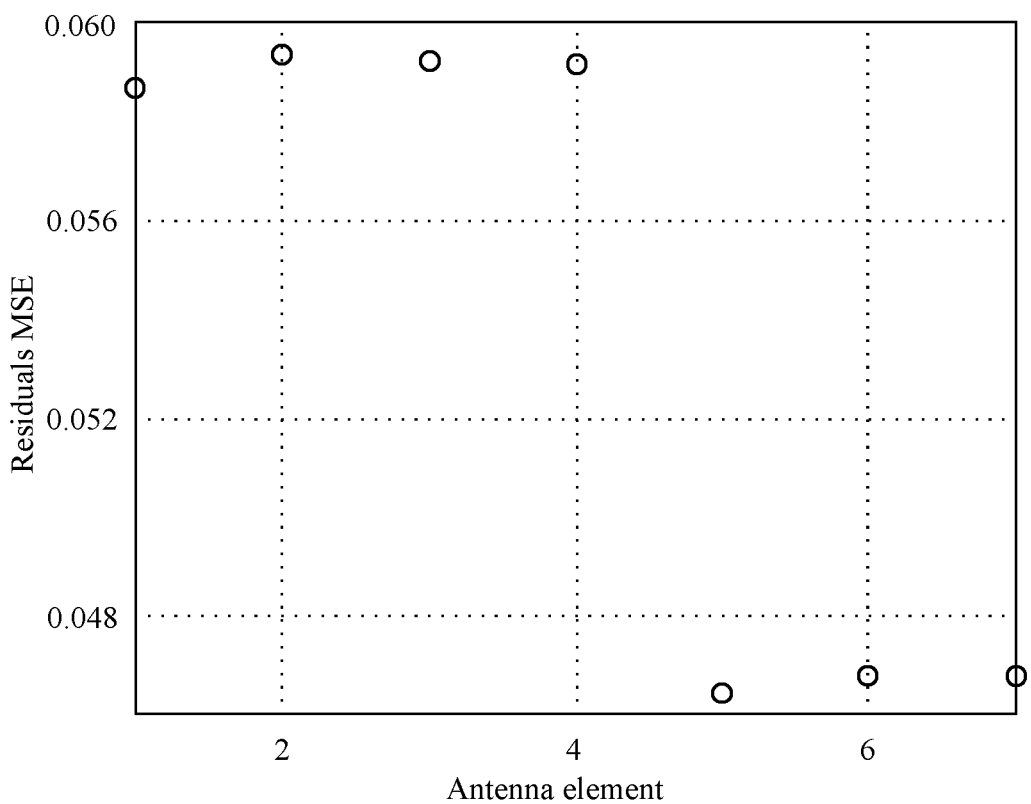
FIG. 6 is a simulation plot illustrating example results achievable according to some embodiments.

FIGS. 5 and 6 illustrate example results achievable according to some embodiments, with particular reference to the examples above relating to the first group of embodiments and a situation when prior knowledge is not available.

In the above examples referring to such a situation, preference is given to the use of transmitter settings in which the maximum number of simultaneously activated transmitters is minimized. To verify this approach, simulations have been performed for two distinct settings when N=5 and M=7; namely the {2,2,1,1,1} setting which is represented by equation (11) and the {3,1,1,1,1} setting which is represented by $$P_{eq}^{(3,1,1,1,1)} = \begin{bmatrix} p_3 & p_8 & p_{12} & 0 & 0 & 0 & 0 \\ p_4 & p_9 & p_{13} & 0 & 0 & 0 & 0 \\ p_5 & p_{10} & p_{14} & 0 & 0 & 0 & 0 \\ p_6 & p_{11} & p_{15} & 0 & 0 & 0 & 0 \\ 0 & 0 & 0 & p_3 & 0 & 0 & 0 \\ 0 & 0 & 0 & p_8 & 0 & 0 & 0 \\ 0 & 0 & 0 & p_{12} & 0 & 0 & 0 \\ 0 & 0 & 0 & p_{16} & 0 & 0 & 0 \\ 0 & 0 & 0 & p_{17} & 0 & 0 & 0 \\ 0 & 0 & 0 & p_{18} & 0 & 0 & 0 \\ 0 & 0 & 0 & 0 & p_4 & 0 & 0 \\ 0 & 0 & 0 & 0 & p_9 & 0 & 0 \\ 0 & 0 & 0 & 0 & p_{13} & 0 & 0 \\ 0 & 0 & 0 & 0 & p_{16} & 0 & 0 \\ 0 & 0 & 0 & 0 & p_{19} & 0 & 0 \\ 0 & 0 & 0 & 0 & p_{20} & 0 & 0 \\ 0 & 0 & 0 & 0 & 0 & p_9 & 0 \\ 0 & 0 & 0 & 0 & 0 & p_{10} & 0 \\ 0 & 0 & 0 & 0 & 0 & p_{14} & 0 \\ 0 & 0 & 0 & 0 & 0 & p_{17} & 0 \\ 0 & 0 & 0 & 0 & 0 & p_{19} & 0 \\ 0 & 0 & 0 & 0 & 0 & p_{21} & 0 \\ 0 & 0 & 0 & 0 & 0 & 0 & p_6 \\ 0 & 0 & 0 & 0 & 0 & 0 & p_{11} \\ 0 & 0 & 0 & 0 & 0 & 0 & p_{15} \\ 0 & 0 & 0 & 0 & 0 & 0 & p_{18} \\ 0 & 0 & 0 & 0 & 0 & 0 & p_{20} \\ 0 & 0 & 0 & 0 & 0 & 0 & p_{21} \end{bmatrix} \quad (13)$$

Comparing equations (11) and (13), it can be noted that the last three columns of both matrices present no challenge regarding their favorable properties since they are mutually orthogonal. Thus, what influences the favorable properties is the interplay between the first four columns. In the case of equation (11), unfavorable properties will occur when the first column is similar to a scaled version of the second column and/or when the third column is similar to a scaled version of the fourth column. In the case equation (13), unfavorable properties will occur when the first column is similar to any linear combination of the first and second columns. The probability of the latter is larger than the probability of unfavorable properties occurring for the case of equation (11). Thus, it may be intuitively expected that the case associated with simultaneously activating three transmitters for one transmission interval results in lower calibration accuracy than the case associated with simultaneously activating two transmitters at two different transmission intervals.

In the simulations, the non-zero entries of $T'_{BS}$ and $R_{BS}$ are defined as independent and identically distributed (i.i.d.) unit-length phasors with uniform phase distribution across $[0,2\pi[$. The non-diagonal entries of $H_c$ are i.i.d. zero-mean unit-variance circularly symmetric complex-valued Gaussian variables, and the non-diagonal entries of N are i.i.d. zero-mean circularly symmetric complex-valued Gaussian variables with variance $\sigma^2$. The calibration signal-to-noise ratio (SNR) is defined as $\sigma^{-2}$. The least-squares alternating algorithm described above is used to estimate the calibration factors.

When the application for the calibration is in the context of (reciprocity-based) beamforming (and beamforming is only concerned with complex amplitude differences between antenna elements, and not with their absolute values), any scaled version of a calibration vector is equally good in terms of beamforming performance, i.e., the vector estimate ĉ is as good as the vector αĉ, where α is any non-zero complex number. Thus, one calibration performance metric that takes this into account is the cosine of the principal angle between the subspace spanned by the true coefficient vector c and the subspace spanned by the vector estimate ĉ. For example, when the estimate is perfect and the subspace of c is perfectly aligned with the subspace of ĉ, the metric equals one. This metric can be written as $$\text{Alignment} = \frac{c^H \hat{c}}{\sqrt{c^H c \hat{c}^H \hat{c}}}.$$

The simulations uses the case of N=M=7 as an upper bound in performance, and studies the two cases of N=5 associated with equations (11) and (13), which gives an overhead reduction of 1−5/7∼29%.

FIG. 5 illustrates, as a function of the signal-to-noise ratio (SNR), the calibration alignment achieved with full overhead—represented by circles, alignment achieved for the case associated with equation (11)—represented by crosses, and alignment achieved for the case associated with equation (13)—represented by squares. It can be seen that there is an inherent performance loss associated with using lower N. At high SNR, the results associated with N=5 converge to alignment one, even if at a lower rate than the full overhead results. Thus, as SNR approaches infinity, all of the simulated methods archive perfect calibration. Furthermore, the calibration quality is good enough for all of the three methods also at reasonably high SNR. Hence it is reasonable to trade-off calibration accuracy and signaling overhead. It should also be noted that, for N=5, the setting corresponding to equation (11) is better than the setting corresponding to equation (13).

FIG. 6 illustrates mean square error (MSE) of the calibration residuals when using the setting corresponding to equation (11) at an SNR of 15 dB. The residual MSE for the $m^{th}$ transceiver antenna is calculated as $$MSE_m = \varepsilon\{|c_m - \theta\hat{c}_m|^2\}$$

where $\varepsilon\{\bullet\}$ is the expectation operator, and $\theta$ is the alignment parameter between the vectors c and $\hat{c}$, i.e., the parameter which minimizes each instance of $\|c-\theta\hat{c}\|^2$. It can be seen that the first four transceiver antennas are associated with lower calibration quality than the last three transceiver antennas, as expected, which motivates a rotation approach as mentioned above.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a network node).

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of over-the-air beamforming calibration for a multi-antenna transceiver having a first plurality of antenna elements connected to respective transceiver chains, wherein beamforming calibration comprises determining respective beamforming calibration factors for the transceiver chains of the antenna elements of the first plurality, the method comprising:
   determining a second plurality of measurement resources for calibration sounding, wherein the second plurality is smaller than the first plurality;
   for each measurement resource of the second plurality, selecting one or more antenna elements of the first plurality for sounding signal transmission, wherein each antenna element of the first plurality is selected for one or more of the measurement resources of the second plurality; and
   using each measurement resource of the second plurality, overlappingly transmitting respective sounding signals by the selected one or more antenna elements, wherein beamforming calibration comprises determining respective beamforming calibration factors for the transceiver chains of the antenna elements of the first plurality based on sounding signal transmission measurements, and wherein a first transfer function defines a relation between the sounding signal transmission measurements and the beamforming calibration factors.

2. The method of claim 1, wherein, when selecting one or more antenna elements for sounding signal transmission comprises selecting two or more antenna elements for overlapping sounding signal transmission using a measurement resource, the selection comprises selecting antenna elements having a mutual coupling that exceeds a mutual coupling threshold; and
   wherein the mutual coupling is in relation to a non-selected antenna element.

3. The method of claim 1, wherein determining the second plurality comprises selecting a first size of the second plurality for a first traffic load of a communication system wherein the multi-antenna transceiver is operating, and selecting a second size of the second plurality for a second traffic load of the communication system, wherein the first size is larger than the second size when the first traffic load is lower than the second traffic load.

4. The method of claim 1, wherein determining the second plurality comprises selecting a third size of the second plurality for a first calibration measurement quality metric, and selecting a fourth size of the second plurality for a second calibration measurement quality metric, wherein the third size is larger than the fourth size when the first calibration measurement quality metric indicates lower calibration measurement quality than the second calibration measurement quality metric.

5. The method of claim 1, further comprising:
   acquiring sounding signal transmission measurements by receiving, using each measurement resource of the second plurality and for each non-transmitting antenna element of the first plurality, a signal corresponding to the one or more transmitted respective sounding signals; and determining respective beamforming calibration factors for the transceiver chains of the antenna elements of the first plurality based on the received signals.

6. The method of claim 1, further comprising:
performing channel estimation; and
beamforming a communication signal based on the channel estimation and based on the determined beamforming calibration factors, and transmitting the communication signal to the one or more other transceivers.

7. The method of claim 6, wherein performing channel estimation comprises performing reception channel estimation, and wherein beamforming the communication signal based on the channel estimation and based on the determined beamforming calibration factors comprises computing a beamformer using un-calibrated reception channel estimates and applying the determined beamforming calibration factors to the computed beamformer.

8. The method of claim 1, wherein
determining the second plurality is conditioned on that a number of sounding signal transmission measurements achievable using the second plurality of measurement resources is larger than, or equal to, a sum of a number of beamforming calibration factors to be determined and a number of parameters of the first transfer function.

9. The method of claim 1, wherein each beamforming calibration factor represents a ratio between receiver path gain and transmitter path gain for a corresponding transceiver chain or a ratio between transmitter path gain and receiver path gain for a corresponding transceiver chain.

10. The method of claim 1, wherein the beamforming calibration is for providing a calibrated transmission channel which is closer to reciprocal with an un-calibrated reception channel than an un-calibrated transmission channel is.

11. The method of claim 1, wherein:
each respective transceiver chain comprises a transmitter chain and a receiver chain, and wherein determining respective beamforming calibration factors for the transceiver chains of the antenna elements of the first plurality comprises determining respective beamforming calibration factors for the transmitter chains and/or determining respective beamforming calibration factors for the receiver chains; and
beamforming calibration comprises determining respective beamforming calibration factors for the transceiver chains of the antenna elements of the first plurality based on sounding signal transmission measurements, and wherein the sounding signal transmission measurements is a function of the beamforming calibration factors and mutual couplings between the antenna elements of the first plurality,
and wherein the method is characterized by one or both of:
determining the second plurality is conditioned on that a number of sounding signal transmission measurements achievable using the second plurality of measurement resources is larger than, or equal to, a sum of a number of beamforming calibration factors to be determined; and
a second transfer function defines a relation between the sounding signal transmission measurements and the beamforming calibration factors for the transmitter chains, the second transfer function being based on the beamforming calibration factors for the receiver chains and the mutual couplings between the antenna elements of the first plurality.

12. A non-transitory computer readable medium, having thereon a computer program comprising program instructions, the computer program being loadable into a data processing unit and configured to cause execution of a method when the computer program is run by the data processing unit, wherein the method is for over-the-air beamforming calibration for a multi-antenna transceiver having a first plurality of antenna elements connected to respective transceiver chains, wherein beamforming calibration comprises determining respective beamforming calibration factors for the transceiver chains of the antenna elements of the first plurality, and wherein the method comprises:

determining a second plurality of measurement resources for calibration sounding, wherein the second plurality is smaller than the first plurality;

for each measurement resource of the second plurality, selecting one or more antenna elements of the first plurality for sounding signal transmission, wherein each antenna element of the first plurality is selected for one or more of the measurement resources of the second plurality; and using each measurement resource of the second plurality, overlappingly transmitting respective sounding signals by the selected one or more antenna elements, wherein beamforming calibration comprises determining respective beamforming calibration factors for the transceiver chains of the antenna elements of the first plurality based on sounding signal transmission measurements, and wherein a first transfer function defines a relation between the sounding signal transmission measurements and the beamforming calibration factors.

13. An apparatus for over-the-air beamforming calibration of a multi-antenna transceiver having a first plurality of antenna elements connected to respective transceiver chains, wherein beamforming calibration comprises determining respective beamforming calibration factors for the transceiver chains of the antenna elements of the first plurality, the apparatus comprising controlling circuitry configured to cause:

determination of a second plurality of measurement resources for calibration sounding, wherein the second plurality is smaller than the first plurality;

for each measurement resource of the second plurality, selection of one or more antenna elements of the first plurality for sounding signal transmission, wherein each antenna element of the first plurality is selected for one of the measurement resources of the second plurality; and using each measurement resource of the second plurality, overlapping transmission of respective sounding signals by the selected one or more antenna elements, wherein beamforming calibration comprises determining respective beamforming calibration factors for the transceiver chains of the antenna elements of the first plurality based on sounding signal transmission measurements, and wherein a first transfer function defines a relation between the sounding signal transmission measurements and the beamforming calibration factors.

14. The apparatus of claim 13,
wherein, when selection of one or more antenna elements for sounding signal transmission comprises selection of two or more antenna elements for overlapping sounding signal transmission using a measurement resource, the controlling circuitry is configured to cause selection of antenna elements having a mutual coupling that exceeds a mutual coupling threshold; and wherein the mutual coupling is in relation to a non-selected antenna element.

15. The apparatus of claim 13, wherein determination of the second plurality comprises selection of a first size of the second plurality for a first traffic load of a communication system wherein the multi-antenna transceiver is operating, and selection of a second size of the second plurality for a second traffic load of the communication system, wherein the first size is larger than the second size when the first traffic load is lower than the second traffic load.

16. The apparatus of claim 13, wherein determination of the second plurality comprises selection of a third size of the second plurality for a first calibration measurement quality metric, and selection of a fourth size of the second plurality for a second calibration measurement quality metric, wherein the third size is larger than the fourth size when the first calibration measurement quality metric indicates lower calibration measurement quality than the second calibration measurement quality metric.

17. The apparatus of claim 13, wherein:
the controlling circuitry is further configured to cause acquisition of sounding signal transmission measurements by causing reception, using each measurement resource of the second plurality and for each non-transmitting antenna element of the first plurality, of a signal corresponding to the one or more transmitted respective sounding signals; and
the controlling circuitry is further configured to cause determination of respective beamforming calibration factors for the transceiver chains of the antenna elements of the first plurality based on the received signals.

18. The apparatus of claim 13, wherein:
the controlling circuitry is further configured to cause performance of channel estimation; and
the controlling circuitry is further configured to cause beamforming of a communication signal based on the channel estimation and based on the determined beamforming calibration factors, and transmission of the communication signal to the one or more other transceivers.

19. The apparatus of claim 18, wherein performance of channel estimation comprises performance of reception channel estimation, and wherein beamforming of the communication signal based on the channel estimation and based on the determined beamforming calibration factors comprises computation of a beamformer using un-calibrated reception channel estimates and application of the determined beamforming calibration factors to the computed beamformer.

20. The apparatus of claim 13, wherein
determination of the second plurality is conditioned on that a number of sounding signal transmission measurements achievable using the second plurality of measurement resources is larger than, or equal to, a sum of a number of beamforming calibration factors to be determined and a number of parameters of the first transfer function.

21. The apparatus of claim 13, wherein each beamforming calibration factor represents a ratio between receiver path gain and transmitter path gain for a corresponding transceiver chain or a ratio between transmitter path gain and receiver path gain for a corresponding transceiver chain.

22. The apparatus of claim 13, wherein the beamforming calibration is for providing a calibrated transmission channel which is closer to reciprocal with an un-calibrated reception channel than an un-calibrated transmission channel is.

23. The apparatus of claim 13, wherein:
each respective transceiver chain comprises a transmitter chain and a receiver chain, and wherein determination of respective beamforming calibration factors for the transceiver chains of the antenna elements of the first plurality comprises determination of respective beamforming calibration factors for the transmitter chains and/or determination of respective beamforming calibration factors for the receiver chains; and
beamforming calibration comprises determination of respective beamforming calibration factors for the transceiver chains of the antenna elements of the first plurality based on sounding signal transmission measurements, and wherein the sounding signal transmission measurements is a function of the beamforming calibration factors and mutual couplings between the antenna elements of the first plurality,
the apparatus is characterized by one or both of:
determination of the second plurality is conditioned on that a number of sounding signal transmission measurements achievable using the second plurality of measurement resources is larger than, or equal to, a sum of a number of beamforming calibration factors to be determined; and
a second transfer function defines a relation between the sounding signal transmission measurements and the beamforming calibration factors for the transmitter chains, the second transfer function being based on the beamforming calibration factors for the receiver chains and the mutual couplings between the antenna elements of the first plurality.

24. A wireless communication device comprising the apparatus of claim 13.

\* \* \* \* \*